No. 688,504. Patented Dec. 10, 1901.
C. F. DARNELL & J. R. DUNCAN.
RUBBER TIRE SETTING MACHINE.
(Application filed May 28, 1900.)
(No Model.) 2 Sheets—Sheet 1.
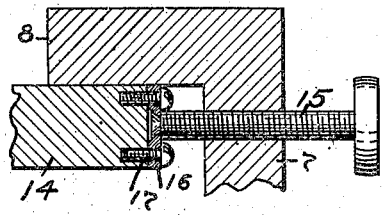
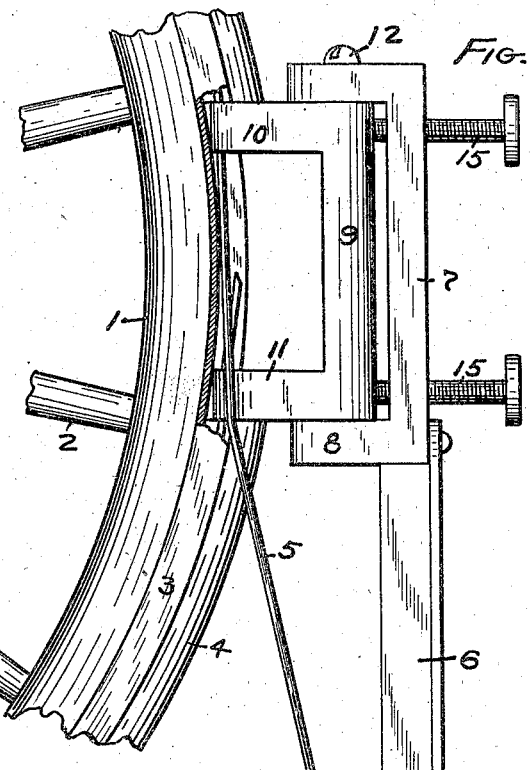
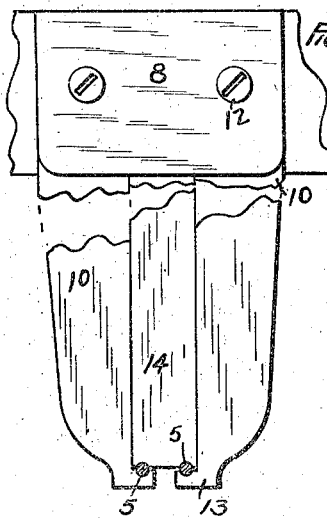
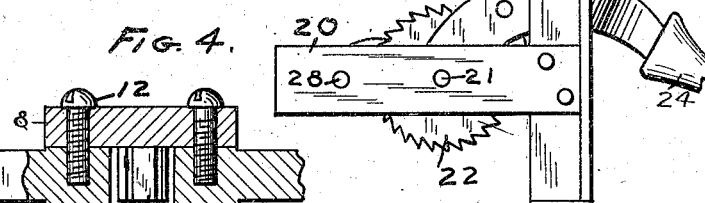
WITNESSES:
M. C. Buck
G. H. Blaker
INVENTORS.
Calvin F. Darnell and
John R. Duncan
By V. H. Lockwood
Their ATTORNEY.

No. 688,504. Patented Dec. 10, 1901.
C. F. DARNELL & J. R. DUNCAN.
RUBBER TIRE SETTING MACHINE.
(Application filed May 28, 1900.)
(No Model.) 2 Sheets—Sheet 2.
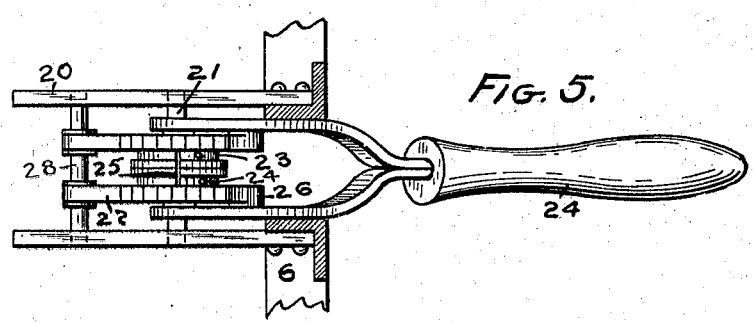
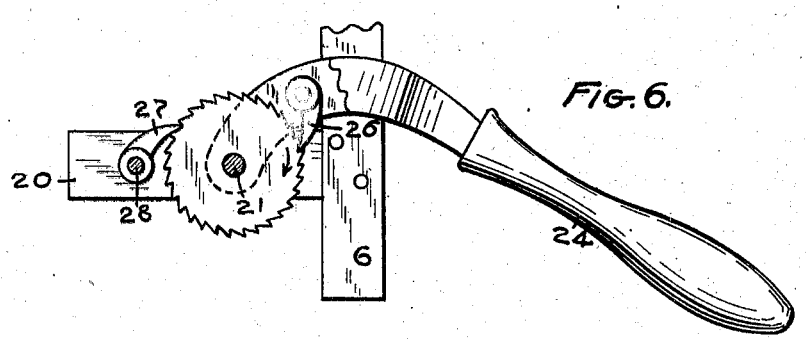
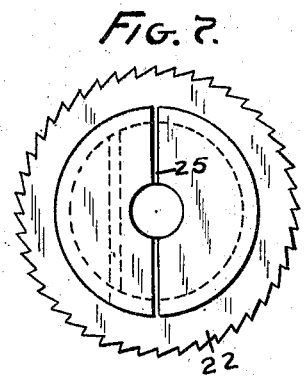
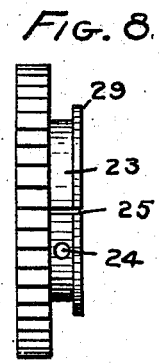
WITNESSES:
M. C. Buck
G. H. Blaker
INVENTORS.
Calvin F. Darnell and
John R. Duncan
V. H. Lockwood
Their ATTORNEY.

UNITED STATES PATENT OFFICE.

CALVIN F. DARNELL AND JOHN R. DUNCAN, OF INDIANAPOLIS, INDIANA, ASSIGNORS, BY DIRECT AND MESNE ASSIGNMENTS, TO VEHICLE RUBBER TIRE MACHINE COMPANY, OF INDIANAPOLIS, INDIANA.

RUBBER-TIRE-SETTING MACHINE.

SPECIFICATION forming part of Letters Patent No. 688,504, dated December 10, 1901.

Application filed May 28, 1900. Serial No. 18,345. (No model.)

*To all whom it may concern:*

Be it known that we, CALVIN F. DARNELL and JOHN R. DUNCAN, of Indianapolis, Marion county, Indiana, have invented a certain new and useful Rubber-Tire-Setting Machine; and we do hereby declare that the following is a full, clear, and exact description thereof, reference being had to the accompanying drawings, in which like numerals refer to like parts.

The object of this invention is to provide new means for holding and tightening the bands of rubber tires in the channel-irons of wheels preliminary to welding or brazing or otherwise securing the cut ends of the bands together, whereby the bands and the rubber tire are held on the wheel. The advantage sought in such new means is simplicity of construction and convenience and rapid manipulation in operation.

The full nature of our invention will be understood from the accompanying drawings and the description following of one form of device embodying said invention, and the scope of said invention will be understood from the claims following said description.

In the drawings, Figure 1 is an elevation of a portion of a vehicle-wheel and the portion of a rubber-tire-setting machine containing our improvements, the channel-iron of the vehicle-wheel being partly broken away for illustration and also the handle of the band-tightener. Fig. 2 is a vertical central section through a part of the upper end of the band-holding device. Fig. 3 is a plan of the band-holding device, partly broken away. Fig. 4 is an inside elevation of the band-holding device with the jaws thereof opened out and with parts cut away in vertical section to show the construction. Fig. 5 is a plan of the band-tightener and its mounting in the frame. Fig. 6 is a side elevation of the band-tightener with one side thereof broken away. Fig. 7 is an outside elevation of one of the band-tightening wheels. Fig. 8 is a plan thereof.

Referring now to the details of construction of the machine herein shown for the purpose of illustrating the nature of our invention, 1 is the felly, and 2 the spokes, of an ordinary carriage-wheel, which may be mounted in any suitable manner upon a horizontal table or frame. (Not shown.)

3 is a channel-iron made in the usual form, and 4 is the rubber tire. Said rubber tire is provided, as is quite common, with two longitudinal holes through it, and through these holes bands or wires 5 extend for the purpose of fastening the rubber tire in the channel-iron.

A vertical frame 6 is mounted upon the table or platform, (not shown,) which carries the wheel to which the tire is to be applied. Said frame 6 should be suitably braced to hold it vertical, although no braces are here shown, as they constitute no part of this invention. Upon said frame 6 a frame 7 is rigidly mounted opposite the portion of the wheel where the ends of the band are to be united. Said frame 7 may be mounted by any suitable means, provided it is held stationary at the proper place. It has two parallel plates 8, that extend toward the wheel and at a right angle to the body of the frame 7. Between said plates 8 we mount a pair of jaw-frames 9 side by side, but separated somewhat, as appears in Fig. 4. Each of said jaw-frames 9 has at its upper and lower ends the upper and lower jaws 10 and 11. The jaw-frame 9 and the upper and lower jaws 10 and 11 are integral herein, but may be otherwise formed so long as they are rigidly secured to each other, thus making the upper and lower jaws immovable independently of each other, so that they cannot be moved separately, and both move together when the jaws are swung laterally. The only movement of said jaws 10 and 11 is the lateral movement to or away from the band 5. This lateral movement is rendered possible by the jaw-frame 9 being pivoted to the plates 8 by the pivot-pins 12. Each of said jaw-frames 9 or sets of jaws 10 and 11 can be laterally swung away and independently of each other. Each of the jaws 10 and 11 has at its inner end a flange or extension 13, that extends toward and in close proximity to a companion flange or extension on the companion jaw, as shown in Fig. 3. The upper and lower pairs of jaws 10 and 11 do not grip or clamp the tire-band between them; but said band is clamped between said flange or extension 13 and a longitudinally-movable clamping tongue or bar 14. There are two of these tongues 14, one between the upper pair of jaws 10 and one between the lower pair of jaws 11. They are moved longitudinally by the screws 15, that operate horizontally through threaded apertures in the frame 7, as shown in Fig. 2. At its inner end the screw 15 has a circular head that fits loosely in a hole in the plate 16, that is secured to the end of the tongue or bar 14 by the screws 17. Therefore the screw 15 is rotatable, while the tongue 14 is not, and the rotation of the screw 15 will give the tongue 14 longitudinal movement. The bands 5, if more than one is used, are clamped, as shown in Fig. 3, between the end of the tongue 14 and the inner face of the extension 13 on the jaws. This results from the longitudinal movement of the tongue 14 against the band and against the extensions 13, as shown in said Fig. 3. If but one band 5 be used, obviously only set of jaws 10 and 11 is needed to clamp the band.

As shown in Fig. 1, the pair of jaws 10 is above the pair of jaws 11 when the carriage-wheel is placed vertically for mounting the tire. If placed horizontally, then said jaws 10 and 11 will be changed to a horizontal position, so that the plan would be as shown in Fig. 1. The jaw 11 and the accompanying tongue 14 in the manner heretofore described clamp the cut end of the band, as appears in Fig. 1, by tightening the screw 15. The other end of the band 5 is placed loosely between the extensions 13 on jaw 10 and the tongue 14 and is continued outside and beyond or below the jaw 11 to a band-tightening device, and when the band is drawn tight by such device the tongue 14 is pushed inward by the screw 15 against jaw 10, thus clamping the band, as appears in Fig. 3. Then the band is cut near the other end of the band and the cut ends secured together in any suitable manner. It is apparent that there is ample space between the jaws 10 and 11 for the insertion of a welding or brazing tool. Likewise the ends of the jaws 10 and 11 are contracted to enter the channel-iron, as shown in Fig. 1. The engaging faces of the extensions 13 and the tongue 14 may have grooves in them, as shown in Fig. 3, to receive the bands 5 if they are in the form of wires.

Turning now to the wire-tightening device, a pair of arms 20 are secured to the vertical frame 6 and extend inward at a right angle, as shown in Fig. 1. In this pair of arms 20 we mount a shaft 21, carrying a pair of ratchet-wheels 22. The ratchet-wheels 22 have on their sides the collars 23, which are provided in the periphery with the holes 24, in which to insert the band to be tightened if it be a wire, and the slot 25, in which to insert the band if it be flat. After the bands 5 are thus secured to the ratchet-wheels 22 they are actuated by the lever 24, that is forked, each fork being loosely mounted on the shaft 21, as shown in Fig. 5, so that said lever can be moved up and down. To the forks of said lever the pawls 26 are secured, that engage the ratchet-wheels and rotate them in the direction of the arrow in Fig. 6. They are held from rotation by the pawls 27, mounted on the shaft 28, that is also carried by the arms 20. When the lever 24 is actuated, the band of wire 5 will be wound around the collar 23 on the ratchet-wheel, and to hold the wire in place a flange 29 is provided for said collar, as shown in Fig. 8. When the band 5 is flat, it is inserted in the slots 25 when they register, as shown in Fig. 5, and such band as the ratchet-wheels are actuated winds around on the adjacent flanges 29, as shown in said figure. This wire-tightener is effective, as great strain can be imparted to the wire without the exertion of much power, and it can be done without much movement of the lever 24 by having the ratchet-teeth on the wheels 22 close together, as shown. The main advantage, however, arising from the use of two ratchet-wheels 22 for the two separate bands 5 is that proper tension may be given to each separate band. In practice each band is secured to its respective ratchet-wheel 22 and the device operated until one of the bands becomes tight enough. If the other band is not yet sufficiently tight, the pawl 25, that actuates the ratchet-wheel to which the tight band is secured, is thrown back by the finger out of engagement with such ratchet-wheel, so that further movement of the lever 24 will actuate only the wheel to which the loose band is secured until it is tight enough. Therefore the two wheels can be actuated singly or together, as desired.

What we claim as our invention, and desire to secure by Letters Patent, is—

1. A rubber-tire-setting machine including a band-holding device formed of three parallel members one between the others, the outside members having at one end extensions toward each other that do not meet, and means for moving the middle member longitudinally toward and from the extensions on the other members.

2. A rubber-tire-setting machine including a frame-piece, a jaw pivotally mounted at each end of said frame-piece and opposite each other with their ends provided with a lateral extension, a tongue or piece beside each of said jaws, and means operating through said frame-piece for moving said tongues independently and longitudinally toward the extension on the jaws.

3. A rubber-tire-setting machine including a frame-piece, a pair of jaws pivotally mounted at each end of said frame-piece and opposite each other with their ends provided with extensions toward each other, a tongue or middle piece between each pair of jaws, and means operating through said frame-piece for moving said tongues longitudinally.

4. A rubber-tire-setting machine including two oppositely-formed jaw-pieces each consisting of a body portion and a jaw extending at a right angle from each end thereof, a frame in which the bodies of said jaw-pieces are pivoted beside each other with a space between them, a tongue between the ends of the two jaw-pieces, and means operating through the frame for longitudinally moving said tongues independently.

5. In a rubber-tire-setting machine, the combination with band-gripping devices to hold the ends of the bands, of a pair of ratchet-wheels mounted to revolve on the same axial line and independently rotatable, means for securing a single band to each ratchet-wheel, and a single means for actuating said ratchet-wheels singly or together.

6. In a rubber-tire-setting machine, the combination with band-gripping devices to hold the ends of the bands, of two windlasses mounted to revolve on the same axial line and having independent ratchets, pawls to engage said ratchets to prevent reverse movement, and a pivot-lever having independent pawls to engage said ratchets.

7. A rubber-tire-setting machine including a band-tightener provided with a pair of ratchet-wheels, a collar secured to the adjacent side of each wheel, each collar being provided with a slit whereby when the slits of the two collars on the two wheels register with each other they will hold the end of a wide band, and means for actuating said wheels in unison.

8. An improved windlass having independent drums freely mounted on the same axle, each of said drums having separate ratchet-wheels and independent pawls to engage said wheels, and a pivoted forked lever having independent pawls to engage said ratchet-wheels, substantially as shown and described.

In witness whereof we have hereunto affixed our signatures in the presence of the witnesses herein named.

CALVIN F. DARNELL.
JOHN R. DUNCAN.

Witnesses:
M. C. BUCK,
V. H. LOCKWOOD.